May 3, 1932. J. KIPPER 1,856,564

MEAT MOLD

Filed Nov. 20, 1929

INVENTOR
Joseph Kipper
BY
Fred C. Matheny
ATTORNEY

Patented May 3, 1932

1,856,564

UNITED STATES PATENT OFFICE

JOSEPH KIPPER, OF SEATTLE, WASHINGTON

MEAT MOLD

Application filed November 20, 1929. Serial No. 408,624.

My invention relates to improvements in meat molds and is in the nature of an improvement on the meat mold disclosed in my prior Patent No. 1,581,640, issued April 20, 1926.

The general object of my present invention is to improve the construction of meat molds of this nature and to render the same more compact in construction and more reliable and efficient in operation.

More specific objects are to provide a meat mold receptacle of this class having a solid and non-movable bottom and having a top member which is resiliently secured to a retainer bar and is telescopic relative to the mold thus making the device self adjusting to accommodate different amounts of meat in the mold.

Another object is to provide a meat mold of this nature which may be conveniently operated by hand, and one in which the meat will be maintained under constant pressure regardless of shrinkage of the meat during cooking or treating processes.

Further objects are to provide a meat mold that is strong and compact, in construction, neat in appearance, easy to manipulate, not expensive to manufacture and one that is sanitary and easily cleaned and sterilized.

Other and more specific objects will be apparent from the following description taken in connection with the accompanying drawings.

In the drawings Figure 1 is a plan view looking down onto the top of a meat mold constructed in accordance with my invention.

Like reference numerals designate like parts throughout the several views.

Figure 1:
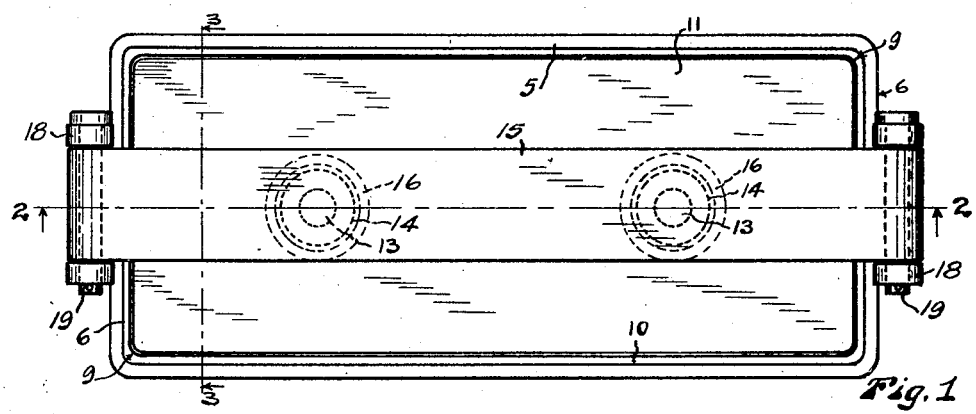

In preparing meat, especially hams and shoulders of pork for the market, it is common practice to remove the bones and then compress and cook the same in a mold. In my prior patent, hereinbefore identified, I have shown a mold receptacle having a cross sectional shape corresponding to the shape of a loaf of bread. In my present application I prefer to retain this same shape but have shown one form of mold which is square or rectangular in cross section to thereby mold a meat loaf of corresponding cross sectional shape.

Referring to the drawings, throughout which like reference numerals designate like parts, I show a rectangularly shaped integral mold receptacle having side walls 5, end walls 6 and a curved bottom 7. The curved bottom wall 7 corresponding to the curved side of a loaf of bread. The end walls extend below the curved bottom 7 to form square supports 8 on which the mold receptacle may rest. All corners within the mold are neatly rounded as at 9 to avoid forming pockets which are unsanitary and difficult to clean and the top edge of the mold is curved outward slightly as at 10, to facilitate the insertion therein of a presser plate 11 which forms a telescopic cover fitting into the mold. The edges of the presser plate 11 are flanged downwardly as at 12 to afford a better bearing against the sides of the mold and to form a concave surface on the side of the presser plate next to the meat. The presser plate fits closely within the mold so that the meat can not be forced upwardly between the wall of the mold and the edges of the presser plate.

The presser plate 11 has two upwardly projecting studs 13 on its top side which fit telescopically into two tubular bosses 14 which extend downwardly from a retainer bar 15. Compression springs 16 are provided on the bosses 14 between the presser plate 11 and the retainer bar 15 to exert a downward pressure on the presser plate when said presser plate is placed on the top of a mold full of meat and the retainer bar is made fast to the mold. The respective ends of the springs 16 are inserted within holes 25 in the base of the studs 13 and in the base of the tubular bosses 14 so that the springs serve to prevent total disconnection of the retainer bar and the presser plate.

The retainer bar 15 is secured to the mold by means of multiple toothed catch members 18 which are connected by pivots 19 with the ends of the retainer bar and have teeth 20 arranged to engage with external catch lugs 21 on the ends of the mold. The lower sides of the lugs 21 are inclined downwardly a slight amount and the upper sides of the teeth 20 on the catch members are similarly inclined upwardly so that after being placed in engagement they will remain in the engaged position as long as upward pressure is exerted on the retainer bar or until they are disengaged manually. The opposite sides of the teeth 20 and lugs 21 are inclined so as to ride over each other when the retainer bar is pushed down.

In the operation of this mold the meat is first placed in the mold receptacle, the presser plate 11 is then fitted into the top of the mold receptacle and allowed to rest on the meat, the catch members 18 hanging down into a suitable position to engage catch lugs 21. A downward pressure is then exerted on the retainer bar 15 to compress the springs 16 and move the catch members 18 down over the lugs 21 thus causing the catch members to engage with the lugs and hold the retainer bar down, thereby maintaining the springs under compression. The mold with the meat in it may then be placed in a retort or cooker and the meat cooked while in the mold. As the meat cooks it will shrink but the springs 16 will expand and keep the meat under constant pressure thus forming a compact loaf. The presser plate is quickly and easily applied and may be quickly and easily removed by releasing the catch members 18 and lifting up on the retainer bar 15. The retainer bar and the presser plate are secured together and also resiliently spaced apart by the springs 16.

Figure 2:
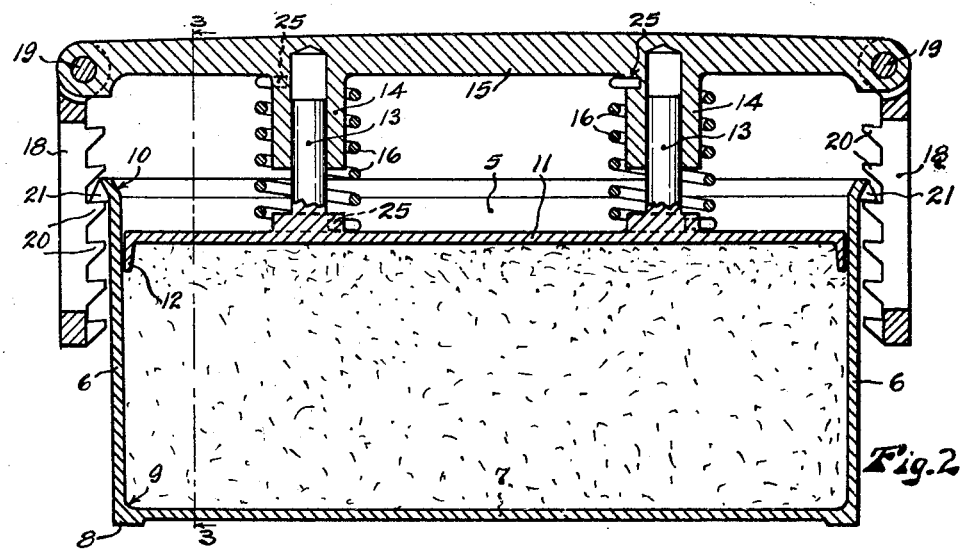
Fig. 2 is a view in longitudinal section of the same substantially or broken line 2—2 of Fig. 1.
Figure 3:
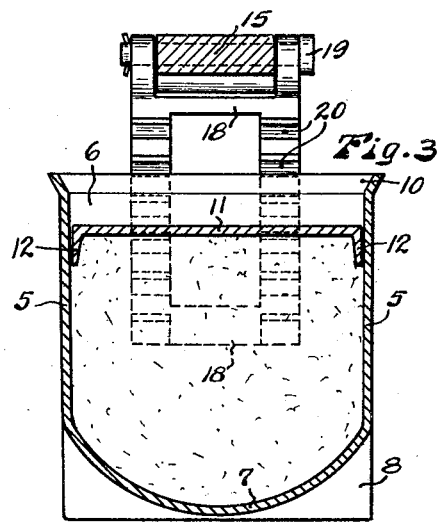
Fig. 3 is a view in cross section on broken line 3—3 of Fig. 2.

The meat loaves formed in the mold shown in Figs. 1 to 3 have square ends and are of substantially the same cross sectional shape as a loaf of bread so that in cutting slices of meat from said meat molds no small fragments need be removed in squaring up the ends as is customary with other forms of meat loaves and the slices cut from these meat loaves will conform to the shape of a loaf of bread thereby facilitating the making of a meat sandwich in which the meat will not protrude from the edges of the slices of bread.

Figure 4:
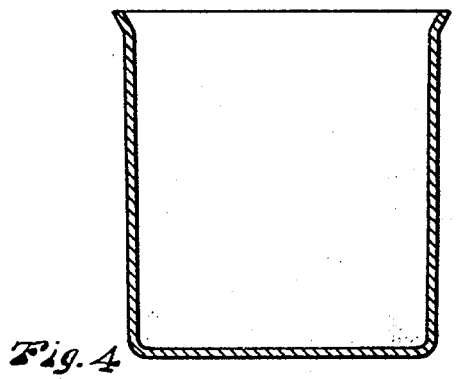
Fig. 4 is a cross section of a meat mold of different shape.

In Fig. 4 I have shown a mold which is the same as the molds shown in Figs. 1, 2 and 3 except that the bottom is flat instead of rounded. This mold makes meat loaves of rectangular cross section instead of making loaves the shape of a loaf of bread.

The foregoing description and accompanying drawings clearly disclose what I now consider to be a preferred embodiment of my invention but it will be understood that this disclosure is merely illustrative and that such changes in the device may be made as are within the scope and spirit of the following claim.

I claim:

A meat mold of the class described, embodying a mold receptacle, a presser plate movably disposed within the upper portion of said mold receptacle, a retainer member disposed lengthwise of said presser plate in spaced relation therefrom, readily releasable means adjustably connecting the ends of said mold receptacle, studs extending upwardly from said presser plate, said studs having base portions of larger diameter provided with holes in the sides thereof, tubular bosses extending downwardly from said retainer bar and fitting snugly over said studs whereby said presser plate and said retainer bar are guided for relative movement toward and away from each other and are securely held against relative sidewise movement, the bases of said bosses having holes in the sides thereof, and helical compression springs fitted over said studs and said bosses and interposed between said presser plate and said retainer bar, the respective ends of said springs engaging within the holes at the bases of said studs and said tubular bosses respectively whereby said presser plate and said retainer bar are mechanically connected together by said springs.

The foregoing specification signed at Seattle, Wash., this 16th day of November, 1929.

JOSEPH KIPPER.